United States Patent
Rothley et al.

(10) Patent No.: US 9,069,646 B2
(45) Date of Patent: Jun. 30, 2015

(54) AUTOMATIC DOCUMENTATION GENERATOR

(71) Applicants: Martina Rothley, Schwetzingen (DE); Johann Kemmer, Muelhausen (DE)

(72) Inventors: Martina Rothley, Schwetzingen (DE); Johann Kemmer, Muelhausen (DE)

(73) Assignee: SAP SE, Walldorf (DE)

(*) Notice: Subject to any disclaimer, the term of this patent is extended or adjusted under 35 U.S.C. 154(b) by 110 days.

(21) Appl. No.: 13/716,438

(22) Filed: Dec. 17, 2012

(65) Prior Publication Data

US 2014/0173562 A1    Jun. 19, 2014

(51) Int. Cl.
*G06F 9/44*    (2006.01)

(52) U.S. Cl.
CPC .................................. *G06F 8/73* (2013.01)

(58) Field of Classification Search
None
See application file for complete search history.

(56) References Cited

U.S. PATENT DOCUMENTS

| | | | | |
|---|---|---|---|---|
| 5,963,958 A * | 10/1999 | Cottrill | ................................. | 1/1 |
| 6,272,508 B1 * | 8/2001 | Dyne et al. | ..................... | 715/210 |
| 6,507,855 B1 * | 1/2003 | Stern | ............................. | 715/234 |
| 7,240,327 B2 * | 7/2007 | Singh et al. | .................... | 717/108 |
| 8,832,654 B2 * | 9/2014 | Malnati | ......................... | 717/123 |
| 2002/0019827 A1 * | 2/2002 | Shiman et al. | ................ | 707/200 |
| 2002/0124115 A1 * | 9/2002 | McLean et al. | ............... | 709/310 |
| 2004/0008223 A1 * | 1/2004 | Britton et al. | ................. | 345/762 |
| 2005/0060688 A1 * | 3/2005 | Kamalakantha | .............. | 717/123 |
| 2006/0010195 A1 * | 1/2006 | Mamou et al. | ................ | 709/203 |
| 2006/0020928 A1 * | 1/2006 | Holloway et al. | ............. | 717/136 |
| 2006/0206789 A1 * | 9/2006 | Bakman et al. | ............... | 715/500 |
| 2007/0016593 A1 * | 1/2007 | Lieske et al. | .................. | 707/100 |
| 2007/0033154 A1 * | 2/2007 | Trainum et al. | .................... | 707/1 |
| 2007/0136662 A1 * | 6/2007 | Khaba | ......................... | 715/530 |
| 2007/0234319 A1 * | 10/2007 | Matsutsuka et al. | .......... | 717/140 |
| 2008/0183762 A1 * | 7/2008 | Komamura | .................... | 707/200 |
| 2010/0023500 A1 * | 1/2010 | Bascom et al. | .................... | 707/5 |
| 2010/0088382 A1 * | 4/2010 | Lee et al. | ...................... | 709/206 |
| 2011/0202933 A1 * | 8/2011 | Sherrill | ......................... | 719/328 |
| 2012/0102458 A1 * | 4/2012 | Meijer et al. | .................. | 717/123 |
| 2012/0216100 A1 * | 8/2012 | Jardine-Skinner et al. | ... | 715/205 |

\* cited by examiner

*Primary Examiner* — Don Wong
*Assistant Examiner* — Daxin Wu
(74) *Attorney, Agent, or Firm* — Mintz Levin Cohn Ferris Glovsky and Popeo, P.C.

(57) ABSTRACT

The subject matter disclosed herein provides methods and apparatus, including computer program products, for generating a list of object descriptions based on an object's relevance for documentation. In one aspect there is provided a method that may include accepting a setting for a filter and a setting for a flag of an object. The filter setting may represent a type of information to be included in a list of object descriptions. The flag setting may represent a category of documentation relevance for the object that may be stored in a repository. The method may include comparing the filter setting with the flag setting of the object, extracting the description of the object from the repository based on the comparing of the flag setting with the filter setting, and generating the list of object descriptions that includes a description of the object. Related systems, apparatus, methods, and/or articles are also described.

18 Claims, 8 Drawing Sheets

Overview / Description / Parameter Structure / Parameter List / System Messages Types MDRSdoc Business Object Action

Order
Saves the purchase order and sends the purchase order to the supplier according to the pe-defined settings (when, via which transmission medium) (BO action "Submit for Order" and ESI "Save")
Save (Draft) (business object as draft)
Saves purchase order without checks (= Hold in SRM) -> status "Draft": object can be deleted
Save as Template
Saves purchase order without checks as template with template flag and a template description.
Send = Send Purchase Order
Specify send options of purchase order (generic screen)
Preview = Print Local Copy
Start test print functionality
Finish (business object) / Resume
Closes the purchase order and notifies SCM: PO display only
Will even in base release be split into "Finish Delivery" and "Finish Invoice" and "Resume Delivery" and "Resume Invoice"
Resume = PO editable again.
Cancel (business object) / Reopen
Cancels PO when the PO was sent to supplier: PO display only.
Reopen = PO editable again -> No longer offered because of problems with B2B messages (12.05.2009)
Delete (business object)
Delete PO in status "Draft = In Preparation", no "Undelete" possible
Warning:  Do you really want to delete this purchase order ?
Do you want to see this message again ?
After using "Delete" PO is display only.
Cancel (UI action)
Cancels displaying / changing purchase order without saving any data.
Close (UI action)
Needed when "Save Draft" is used.

| Subarea | Business Topic | Sub-Processes / Functions | Description |
|---|---|---|---|
| Procurement Strategy | | | Define, implement and monitor procurement strategy |
| | Global Spend Analysis | | Most sourcing projects start by identifying high-potential opportunities, by gathering historical information on how much spend was allocated to certain vendors for different commodity groups. In order to leverage the maximum spend volume for future negotiations, the analysis must span the entire enterprise and include data that is often collected from a wide range of heterogeneous systems. Utilizing master data mapping information - for example, for suppliers, categories, and materials - across multiple execution systems for spend reporting. |
| | | Extract committed spend (PO values) | |
| | | Extract actual spend (Invoice value) | |
| | | Provide reports on committed and actual spend | Reports on maverick spend; top ten suppliers, nrs of suppliers per prod. Category etc. |
| | | Consolidate suppliers via CI mappings | |
| | | Consolidate suppliers via Duns Nr | |
| | | Identify identical supplier products | |
| | | Identify form fit function equivalent products | |
| | | Show spend with intercompany relationships | Example: Using Duns family tree |
| | | Integrate external supplier data to calculate additional KPIs | Dependency ratio, risks etc. |
| | | Categorize POs and Invoices | Add categories based on general ledger and vendor information to non PO Invoices; Add more granular categories to freetext Pos UNSPSC; eclass |
| | | Report by alternative category | |
| | | Alerting | Maverick spend; non price compliance etc. |
| | | Price analysis | |
| | | Integration into Supply Base Management | As starting point for phase out |
| | "Make or Buy" Decision Support | | Provide services in house or buy services externally |
| | Forecast Analysis | | |
| | Category Management | | Tool for project support in sourcing initiatives |
| | Supply Base Management | | |

Columns: 505 Subarea, 510 Business Topic, 515 Sub-Processes / Functions, 520 Description

AUTOMATIC DOCUMENTATION GENERATOR

TECHNICAL FIELD

This disclosure relates generally to data processing and, more particularly, to the automatic generation of software documentation.

BACKGROUND

Software documentation facilitates the use and operation of a software product and is an integral component to software development. Software documentation provides various types of information including, for example, descriptions of the capabilities of a system; technical documentation for blocks of code, algorithms, and application programming interfaces (APIs); and manuals for end users, system administrators, and support staff. Because software documentation provides information for the operation of a software product, documentation should be updated throughout the development life cycle.

Despite the need to keep software documentation current and comprehensive, documentation is generally provided at a very late stage of development. In many instances, documentation is manually generated by knowledge managers with the help of people involved in the development process. Waiting until the end of the development cycle to provide software documentation presents grave risks including, for example, the high likelihood that implementation details for the software product may be forgotten over time. These gaps in knowledge can adversely impact many people including an end user's ability to properly use a software product, a technical partner's ability to customize and/or enhance a software product, as well as a software company's ability to troubleshoot products and answer requests for information (RFIs) for their products.

SUMMARY

In some implementations, methods and apparatus, including computer program products, are provided for generating a list of object description based on an object's relevance for documentation.

In some implementations, there is provided a non-transitory computer-readable medium. The non-transitory computer-readable medium may contain instructions to configure a processor to perform operations. These operations may include accepting a setting for a filter. The filter setting may represent a type of information to be included in a list of object descriptions. These operations may also include accepting a setting for a flag of an object. The flag setting may represent a category of documentation relevance for the object. In some implementations, the object may be stored in a repository. These operations may also include comparing the filter setting with the flag setting of the object, extracting a description of the object from the repository based on the comparing of the flag setting with the filter setting, and generating the list of object descriptions. In some implementations, the list may include a description of the object.

The above methods, apparatus, and computer program products may, in some implementations, further include one or more of the following features.

In some implementations, software documentation may be generated from the list of object descriptions. In some implementations, the type of information to be included in the list of object descriptions and the category of documentation relevance for the object may be selected from the group consisting of an end-user documentation and a technical partner documentation.

In some implementations, the operations may further comprise updating the list of object descriptions when a change event, a create event, or a delete event is detected. In some implementations, the change event may be triggered when the object is changed. In some implementations, the create event may be triggered when a new object is added to the repository. In some implementations, the delete event may be triggered when the object is deleted from the repository.

In still other implementations, the operations may further comprise generating a report of the objects in the repository using the list of object descriptions. The report may include statistics associated with the objects.

With regard to the accepting of the setting for the filter, in some implementations the accepting may include receiving a user entered selection for the filter setting. With regard to the accepting of the setting for the flag, in some implementations the accepting may include receiving a user entered selection for the flag setting from a plurality of flags.

With regard to the comparing of the filter setting with the flag setting of the object, in some implementations the comparing may include determining whether the flag setting of the object is the same as the filter setting.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

Like reference symbols in the various drawings indicate like elements.

DETAILED DESCRIPTION

Software documentation is essential to understanding how a software product works. In many development settings, software documentation is provided at a very late stage of development. Postponing the documentation process risks the loss of implementation details of a software product. The automatic documentation generator disclosed herein resolves this problem by automatically generating and continuously updating a functions and features list of the various modules and entities in a software product in parallel with the software development process. Knowledge managers may polish the raw documentation provided by the functions and features list to generate software documentation for an end user or technical software implementation partner.

Figure 1:
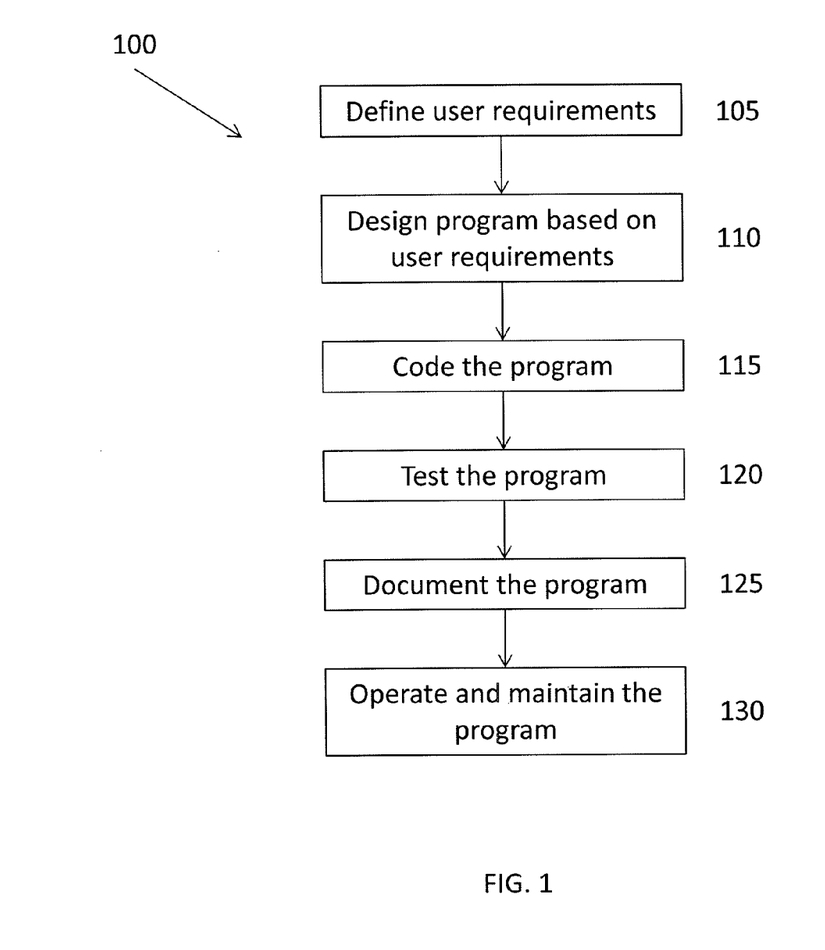
FIG. 1 illustrates a software design process, in accordance with some example implementations.

FIG. 1 illustrates a software design process 100 that spans the entire lifecycle of a software product. This process may begin at 105 when user requirements for the software product are defined. These requirements may be used throughout the development process to describe what the product is expected to do. At 110, software developers may design a program based on the user requirements defined at 105. This design may include a system architecture of the different modules and entities needed for the software product to function properly. At 115, software developers may implement the design into source code using any suitable programming language. The resulting program may be tested at 120, and documentation for the program may be generated at 125. At 130, the software product may be released for operation and future maintenance.

Introducing software documentation towards the end of the development lifecycle at 125 may present many risks. Implementation details including, for example, what a particular function does or why a particular object class was created or modified, may be forgotten at this late stage. Generating software documentation earlier in design process 100 can prevent or reduce the risk that this knowledge is lost. The automatic documentation generator disclosed herein may facilitate this process by generating documentation in parallel with coding process 115.

Generating source code involves the translation of user requirements into a set of computer instructions that are written using a computer programming language. During coding, a programmer may subdivide a software product into various modules. These modules can include different applications, development packages, classes, and methods. Each module can, in turn, be subdivided into different entities that are used by the encapsulating module. The hierarchy of these data structures can be defined using structural metadata that can be stored in a repository.

For example, a supplier relationship management (SRM) system may include various modules that execute different tasks. One of these modules may correspond to a supplier invoice application. The supplier invoice application may, in turn, be associated with various entities such as reports, forms, and business objects used by the application. Structural metadata may define the various fields in the supplier invoice application and its encapsulated entities. Programmers can use this metadata to generate empty containers of these objects. These containers can later be filled with code to define the properties and functions associated with the object.

For sophisticated business software products, hundreds, if not thousands, of software modules and entities may be created from structural metadata. In order to keep track of these objects, programmers may include documentation with their code to describe the object's functions and features. This documentation may be stored in a metadata repository and later extracted to form a functions and features list.

Figure 2A:
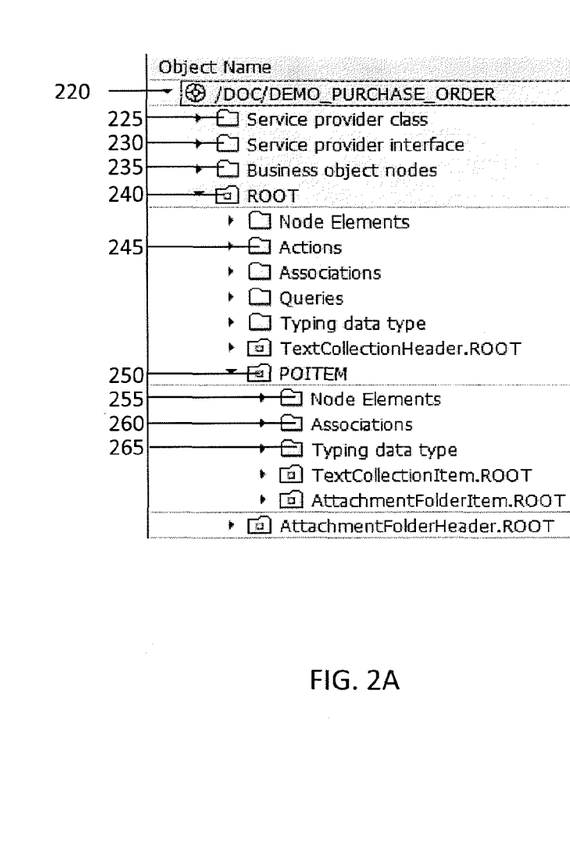
FIGS. 2A, 2B, and 2C illustrate a metadata repository, in accordance with some example implementations.
Figure 2B:
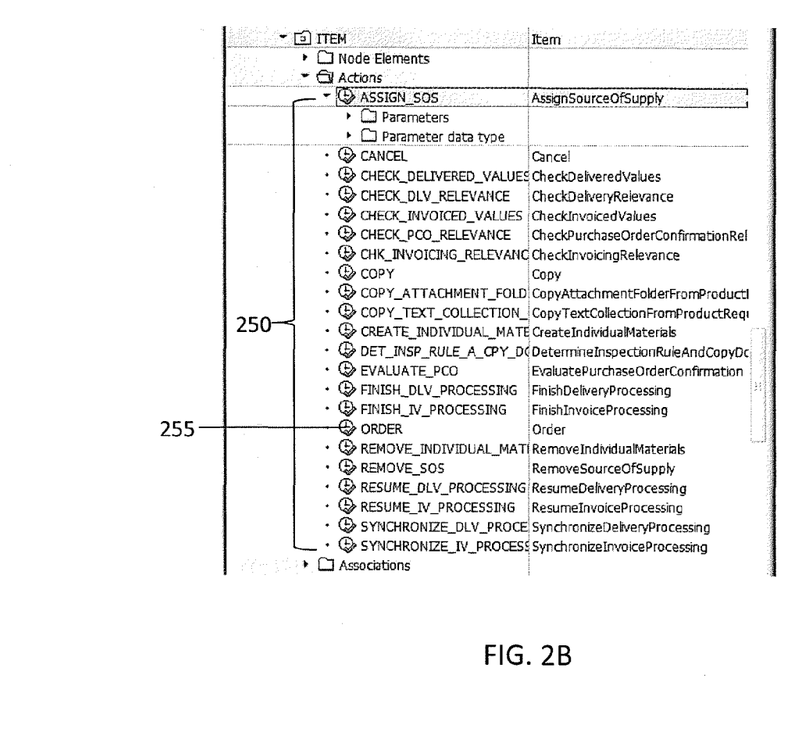
Figure 2C:
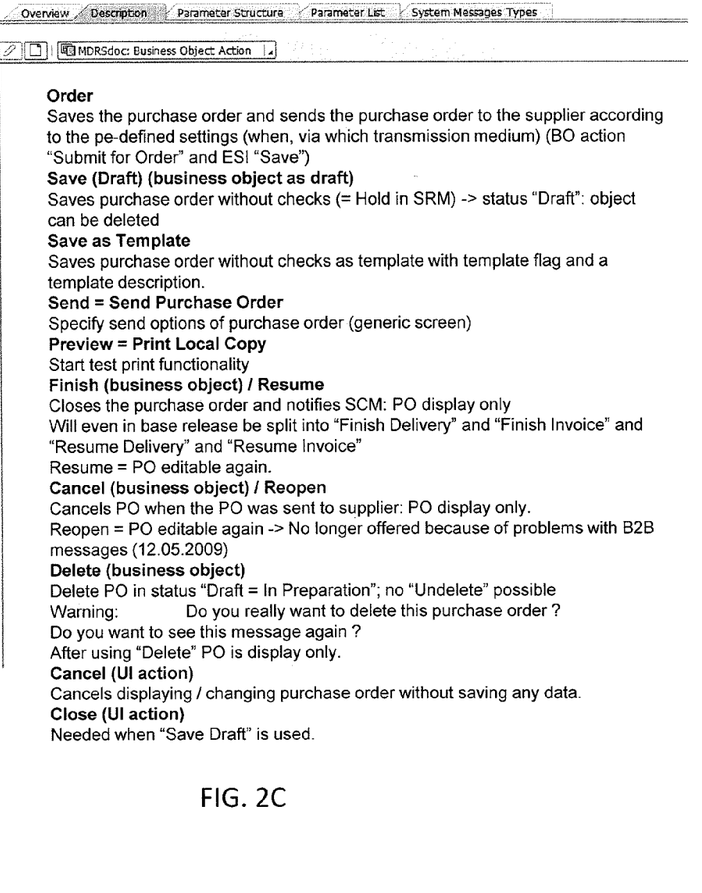

FIGS. 2A, 2B, and 2C illustrate a metadata repository. In particular, these figures display varying levels of information associated with a DEMO_PURCHASE_ORDER business object 220 stored in the repository. This business object may, for example, be part of a module associated with a supplier relationship software product. As shown in FIG. 2A, business object 220 may be comprised of multiple software entities including a service provider class 225, a service provider interface 230, business object nodes 235, and a root node 240. Root node 240 may be further subdivided into various elements including actions 245 that may be performed by the root node. These actions are displayed in FIG. 2B.

FIG. 2B shows a list of actions 250 associated with root node 240. These actions allow the root node to, for example, cancel a purchase order, copy a purchase order, or finish invoice processing for a purchase order. Included within list 250 may be an ORDER action 255. During coding, a programmer may insert a description of ORDER action 255 directly into the source code or into the window of FIG. 2C. According to the description displayed in FIG. 2C, ORDER action 255 allows DEMO_PURCHASE_ORDER 220 to save and send the purchase order to the supplier according to pre-defined settings.

Although FIG. 2C displays a description for ORDER action 255, descriptions for other objects may be inserted as well. These descriptions may form a collection of implementation details that describe, for example, what a particular action does or the type of information that may be stored in the fields of an object. These descriptions may form the basis of a functions and features list.

A functions and features list may be generated by extracting the descriptions of the modules and entities stored in the window illustrated in FIG. 2C or directly from the source code. However, not all objects are relevant for documentation for all users. For example, an end user may not be interested in understanding how a particular action is implemented in code so long as the action performs correctly. In this case, the end user may want a high level description of the action but may be uninterested in understanding any of the underlying technical minutiae. A technical partner, on the other hand, may need to understand these details in order to customize the action for use in a separate application. In this case, the technical partner may need detailed information about how the action is implemented and the data structure of any objects associated with the action. In order to customize the amount of detail that is shown in the functions and features list, modules and entities may be flagged either for end user documentation or technical documentation. Other types of flags may be used including, for example, a flag that indicates that a particular object is always relevant for documentation regardless of the user, a conditional flag that indicates that a particular object is relevant for documentation only when another object is also flagged, a flag that indicates that technical documentation for an object may be used as an initial draft for end user documentation if end user documentation is not available, a flag that indicates that end user documentation for an object may be used as an initial draft for technical documentation if technical documentation is not available, and the like.

Any individual involved in the development process including, for example, a programmer, a product manager, or an input developer, may set the flags for documentation relevance for an entity or module. This may be done by adjusting the properties associated with the object. Object properties may include, for example, the name of the object, who created the object, and when the object was last changed. One or more flags for documentation relevance may also be included in an object's property settings. An object's properties may be viewed and/or modified by clicking any of the objects displayed in FIGS. 2A and 2B.

Figure 3:
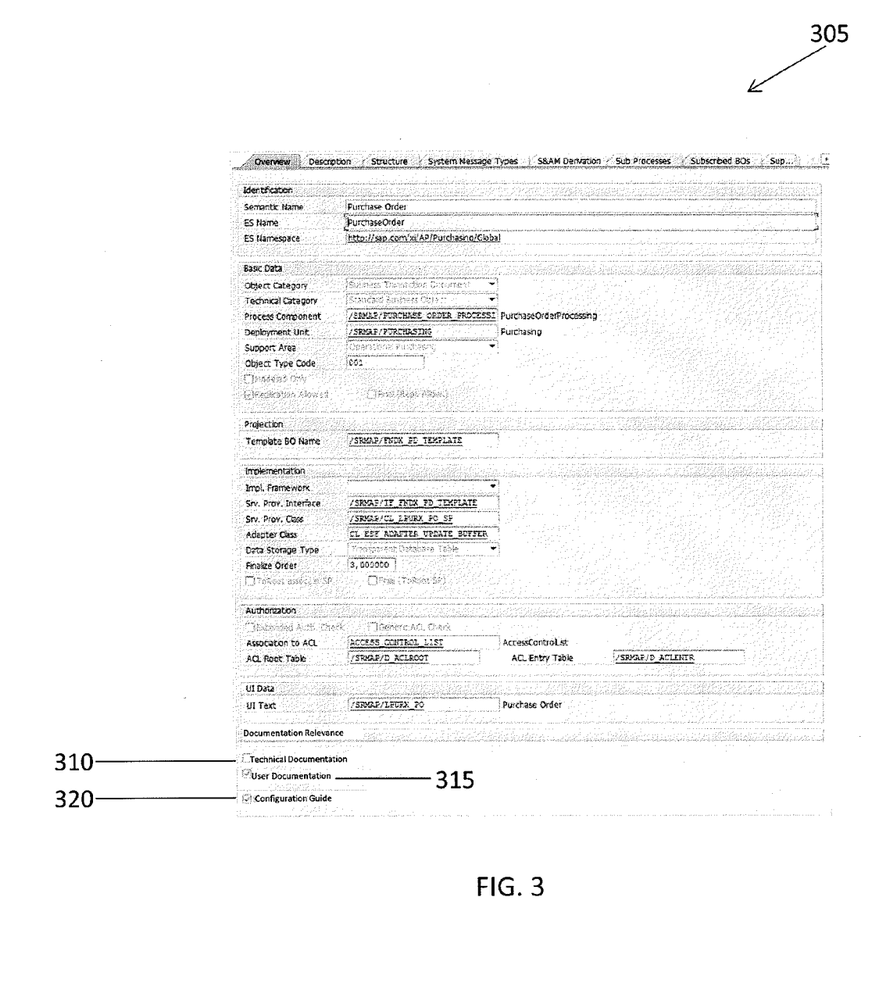
FIG. 3 illustrates a pop-up window that displays flags for document relevance, in accordance with some example implementations.

For example, if a user clicks on ORDER action 255 in FIG. 2B, pop-up window 305 illustrated in FIG. 3 may prompt the developer to manually set one or more document relevance flags for the action by selecting one or more of flags 310, 315, and 320. Although pop-up window 305 only displays three flags, any number of flags may be used. A developer may select one or more of these flags for the object by clicking on a box adjacent to the object. Doing so may fill the box with a checkmark to indicate that the flag has been selected. If the object is not relevant for documentation purposes, then none of the boxes may have checkmarks. In this latter scenario, the object may not be relevant for documentation purposes, and its description may not be included in the functions and features list.

While pop-up window 305 provides a manual means for selecting an object's flag, an object may also automatically inherit flag settings from a parent object. For example, in FIG. 2A, if a developer selects a flag for POITEM 250, then child objects (e.g., node elements 255, associations 260, and typing data type 265) may inherit the same flag. A developer may override the inherited flag setting by manually selecting a different flag for the child object using pop-up window 305.

Figure 4:
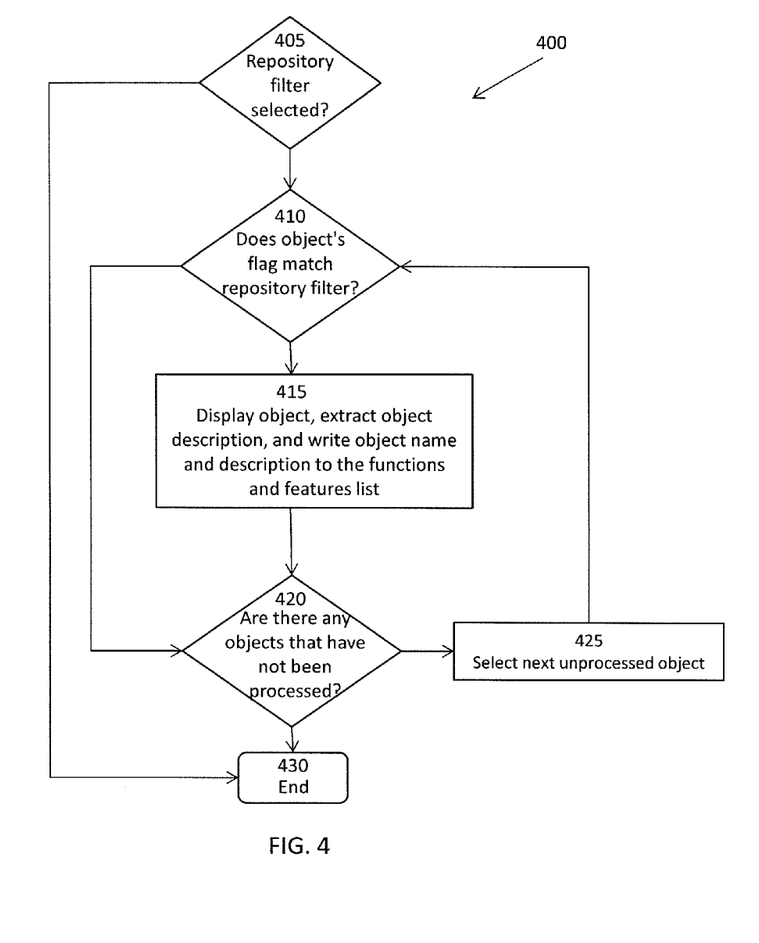
FIG. 4 illustrates a method for generating a functions and features list, in accordance with some example implementations.

FIG. 4 illustrates a method 400 for generating a functions and features list based on an object's flag. An automatic documentation generator may perform method 400 on any of the objects in the repository of FIGS. 2A and 2B.

This method may begin at 405 by determining whether a repository filter has been selected. The repository filter may represent the type of information to be included in the functions and features list and may correspond to the information in any of the flags described above. For example, if a user wants to generate end user documentation from the functions and features list, then the user may select an end user documentation setting for the repository filter. If no filter is selected, then the method may end at 430.

If, however, a repository filter is selected, then processing may proceed to 410. At 410, the automatic documentation generator may compare the object's flag to the repository filter. If the repository filter matches the object's flag, then the automatic documentation generator may display the object and extract the object's description at 415. The automatic documentation generator may write both the object name and the corresponding description to the functions and features list. Depending on its location, the description may be extracted either from the repository illustrated in FIG. 2C, directly from the source code, or from both the repository and the source code. In order to facilitate the extraction process, descriptions that are stored in the repository may be identified as documentation entities using a designated suffix. Similarly, comments stored in the source code may be identified as documentation entities using a designated escape sequence. The escape sequence used may change depending on the programming language. Upon finding either the suffix or escape sequence, the automatic documentation generator may extract the associated description and/or comment.

At 420, the automatic documentation generator may determine whether there are any objects that have not been processed in accordance with method 400. This determination may be made by comparing a timestamp associated with the documentation entity with a timestamp associated with the corresponding object. The documentation entity's timestamp may indicate when the entity's description and/or comment was last extracted. The object's timestamp may indicate when the object was last updated. If these timestamps do not match, then the object may not have been processed. The automatic documentation generator may select the next unprocessed object at 425, and processing may return to 410. If, however, all objects have been processed, then the method may end at 430.

Figure 5:
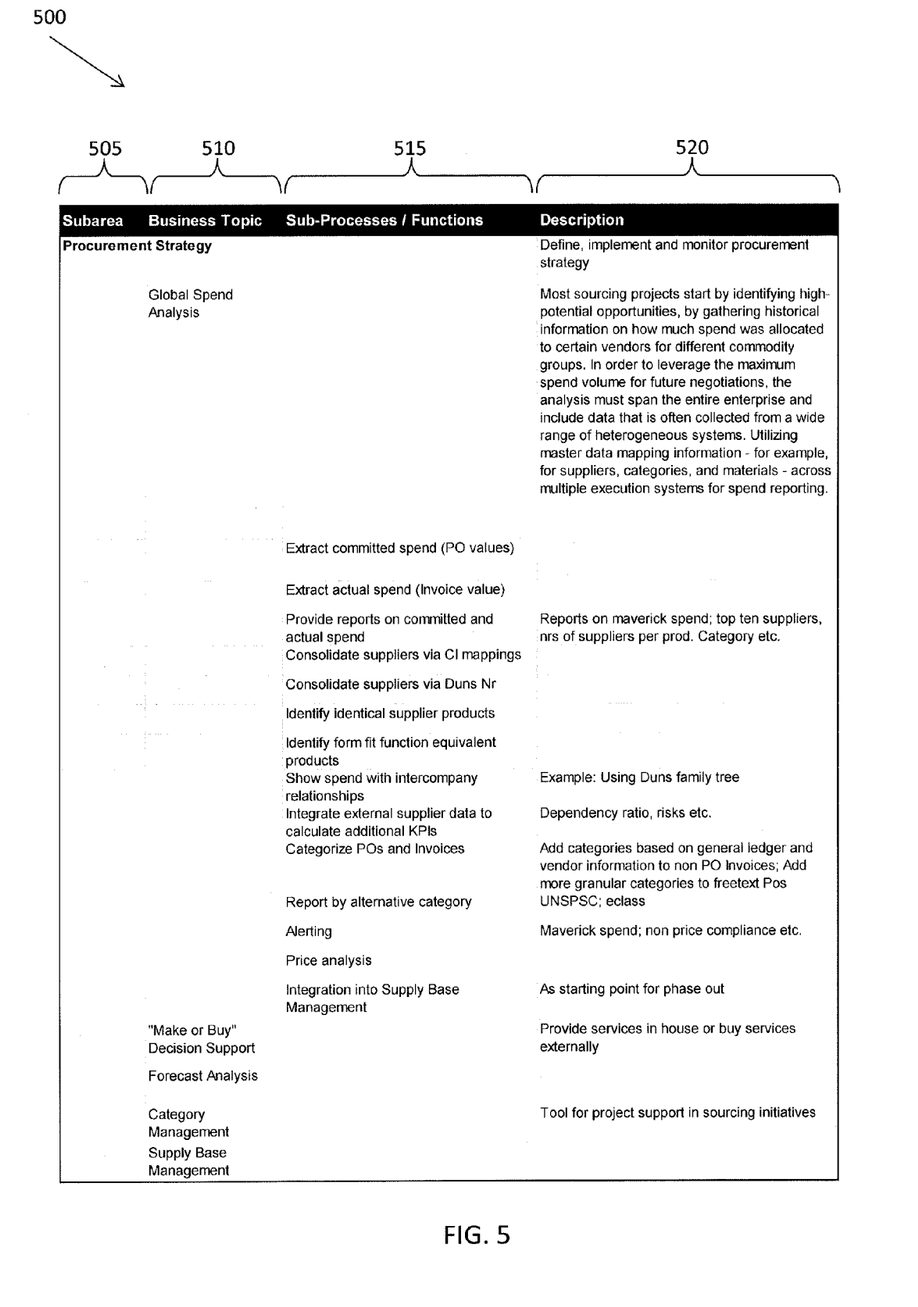
FIG. 5 illustrates a functions and features list, in accordance with some example implementations.

Using method 400, the automatic documentation generator may generate a functions and features list for all objects that have been flagged for documentation. FIG. 5 illustrates a resulting functions and features list 500. This list has multiple columns, each column representing a different level of an application. It is noted that the number of columns in list 500 and the column headings may change depending on the object hierarchy. For example, if the object hierarchy is divided into applications, application areas, packages, and entities, then list 500 may have four object headings and one description heading. Although functions and features list 500 is illustrated as a table, other presentation formats may be used including, for example, a text document.

With regard to list 500, the left-most column may be reserved for subareas 505. Although list 500 displays only one subarea (procurement strategy), other subareas may be included. Each subarea 505 may be associated with one or more business topics 510 (global spend analysis, "make or buy" decision support, etc.). Each business topic 510 may be associated with one or more sub-processes or functions 515. Column 520 may provide a description of the items in the preceding columns. This description may be extracted from the repository illustrated in FIG. 2C or directly from the source code. In list 500, for example, the description for "'make or buy' decision support" describes whether services should be provided in house or externally bought.

Descriptions 520 are generally written by programmers during the coding process. However, these descriptions may be entered by any person and at any point during the software design process including, for example, the early stages of software design (when user requirements are defined) or during post-deployment maintenance of the software product. These descriptions may be entered so long as the software entity being described is already available in the development system. Oftentimes, these descriptions may be written in pseudo-code and may not be easy to understand. A knowledge manager may polish the descriptions from the functions and features list into documentation that may be released to end users and/or technical partners.

In order to ensure that the functions and features list is current, the automatic documentation generator may be configured to automatically detect whether any new software modules or entities have been added to the repository or whether any of the modules or entities stored in the repository have been changed or deleted. As described earlier, each object may be associated with a flag that indicates whether the object is relevant for documentation. This flag may be coupled to an event that indicates whether an object is being added, deleted, or modified. For example, when a programmer creates a new software entity and sets its flag, a CREATE event may be triggered that indicates that a new object has been added to the repository. Similarly, a DELETE event may be triggered when an object has been deleted, and a CHANGE event may be triggered when an object has been modified. The automatic documentation generator may be configured to periodically check for the presence of events as part of a background job or at pre-designated time intervals. Upon detecting an event, the automatic documentation generator may generate an updated version of the functions and features list using method 400.

Figure 6:
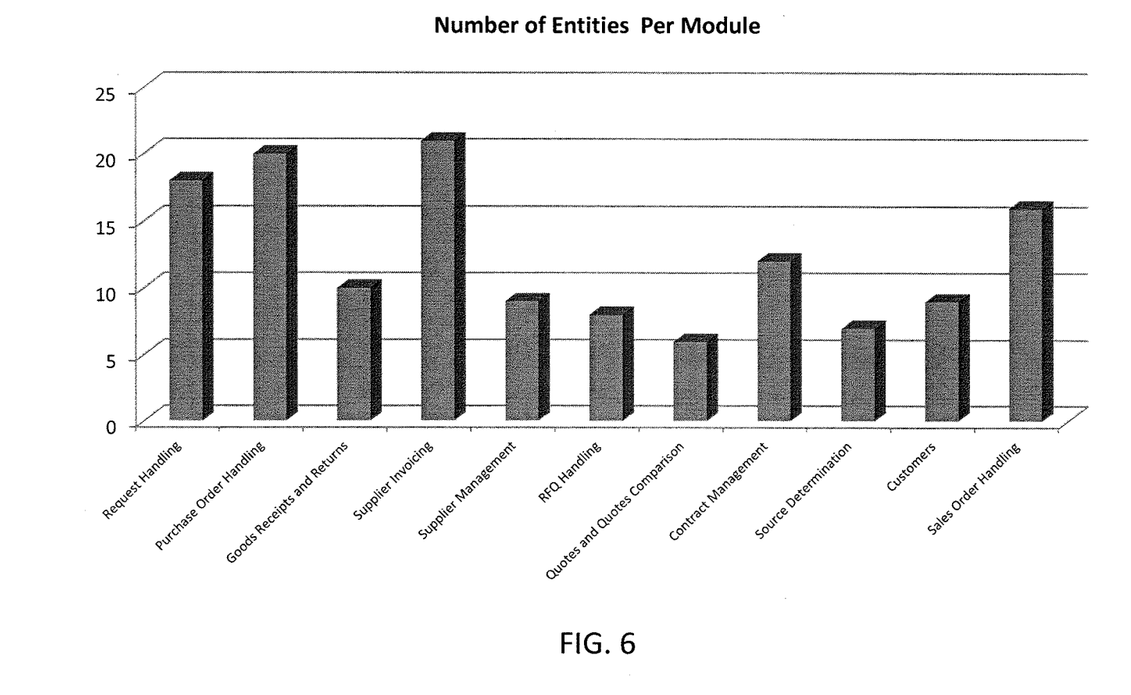
FIG. 6 illustrates a sample report, in accordance with some example implementations.

The automatic documentation generator may generate a variety of reports using the information in previously generated functions and features lists. These reports may track, for example, the number of software modules in a program or the number of software entities per software module by counting the number of modules and entities in a functions and features list. FIG. 6 illustrates a sample report that shows the number of entities in different modules. These numbers may be compared across several functions and features lists to show how these values shift during different stages of development or between releases and to ensure homogeneous documentation for all entities in the software product. The information provided by these reports may be used to enforce proper documentation standards in all areas and by all contributors.

Figure 7:
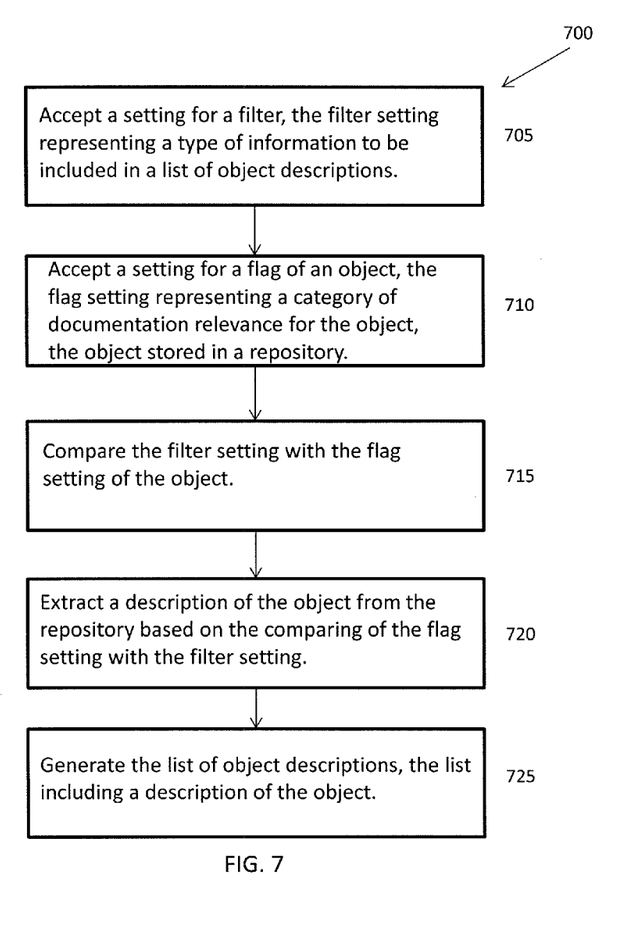
FIG. 7 illustrates another method for generating a functions and features list, in accordance with some example implementations.

FIG. 7 illustrates another process 700 for generating a functions and features list. The description of process 700 also refers to FIGS. 2-5.

At 705, a setting for a filter may be accepted. The filter setting may represent a type of information to be included in a list of object descriptions. For example, if a user wants to generate end user documentation using the list, then the user may select an end user documentation setting for the filter setting. The user's selection may be received by the automatic documentation generator.

At 710, a setting for a flag of an object may be accepted. The flag setting may represent a category of documentation relevance for an object stored in a repository. In some implementations, accepting the flag setting may include receiving a user entered selection for a flag. This flag may be selected, for example, from the set of document relevance flags illustrated in FIG. 3. Alternatively, the user may decide not to select a flag.

At 715, the filter setting may be compared with the flag setting of the object. As described in FIG. 4 at 410, this comparison may include determining whether the filter setting is the same as the flag setting of the object.

At 720, a description of the object may be extracted from the repository based on the comparing of the flag setting with the filter setting. In some implementations, the description may be extracted from the repository illustrated in FIG. 2C. In still other implementations, this description may be extracted from the source code.

At 725, a list of object descriptions may be generated. The generated list may include a description of the object and may be presented in any format including, for example, as list 500 illustrated in FIG. 5.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

What is claimed is:

1. A non-transitory computer-readable medium containing instructions to configure a processor to perform operations comprising:

accepting a setting for a filter, the filter setting representing a type of information to be included in a list of object descriptions, the type corresponding to at least one of an end-user version of a software documentation or a technical version of the software documentation;

accepting a setting for a flag of an object, the flag setting representing a category of documentation relevance for the object stored in a repository, the flag setting corresponding to at least one of a first indication that the object is relevant for the end-user version of the software documentation or a second indication that the object is relevant for the technical version of the software documentation, a third indication that the object is conditional upon the acceptance of another object for inclusion in the software documentation, and a fourth indication that the object is always relevant to generation of the software documentation;

comparing the filter setting with the flag setting of the object to determine whether the object is to be included in the software documentation;

extracting a description of the object from the repository, when the comparing indicates a match between the filter setting and the flag setting; and generating the list of object descriptions, the list including the description of the object; and generating the software documentation from the generated list of object descriptions.

2. The non-transitory computer-readable medium of claim 1, wherein the type of information is defined during code generation and stored in the repository.

3. The non-transitory computer-readable medium of claim 1, the operations further comprising:
updating the list of object descriptions when a change event, a create event, or a delete event is detected.

4. The non-transitory computer-readable medium of claim 3, wherein the change event is triggered when the object is changed.

5. The non-transitory computer-readable medium of claim 3, wherein the create event is triggered when a new object is added to the repository.

6. The non-transitory computer-readable medium of claim 3, wherein the delete event is triggered when the object is deleted from the repository.

7. The non-transitory computer-readable medium of claim 1, the operations further comprising:
generating a report of the objects in the repository using the list of object descriptions, the report including statistics associated with the objects.

8. The non-transitory computer-readable medium of claim 1, wherein the accepting the setting for the filter further comprises:
receiving, from a user interface, a selection of the filter setting.

9. The non-transitory computer-readable medium of claim 1, wherein the accepting the setting for the flag of the object further comprises:
receiving, from a user interface, a selection of at least one of the first indication, the second indication, the third indication, or the fourth indication, wherein the first indication, the second indication, the third indication, or the fourth indication are presented on the user interface.

10. The non-transitory computer-readable medium of claim 1, wherein the comparing further comprises:
determining whether the flag setting of the object is the same as the filter setting.

11. A system comprising:
a processor; and
a memory, wherein the processor and the memory are configured to perform operations comprising:
accepting a setting for a filter, the filter setting representing a type of information to be included in a list of object descriptions, the type corresponding to at least one of an end-user version of a software documentation or a technical version of the software documentation;
accepting a setting for a flag of an object, the flag setting representing a category of documentation relevance for the object stored in a repository, the flag setting corresponding to at least one of a first indication that the object is relevant for the end-user version of the software documentation or a second indication that the object is relevant for the technical version of the software documentation, a third indication that the object is conditional upon the acceptance of another object for inclusion in the software documentation, and a fourth indication that the object is always relevant to generation of the software documentation;

comparing the filter setting with the flag setting of the object to determine whether the object is to be included in the software documentation;

extracting a description of the object from the repository, when the comparing indicates a match between the filter setting and the flag setting; and generating the list of object descriptions, the list including the description of the object; and generating the software documentation from the generated list of object description.

12. The system of claim 11, wherein the type of information is defined during code generation and stored in the repository.

13. The system of claim 11, the operations further comprising:
updating the list of object descriptions when a change event, a create event, or a delete event is detected.

14. The system of claim 11, the operations further comprising:
generating a report of the objects in the repository using the list of object descriptions, the report including statistics associated with the objects.

15. The system of claim 11, wherein the accepting the setting for the filter further comprises:
receiving, from a user interface, a selection of the filter setting.

16. The system of claim 11, wherein the accepting the setting for the flag of the object further comprises:
receiving, from a user interface, a selection of at least one of the first indication, the second indication, the third indication, or the fourth indication, wherein the first indication, the second indication, the third indication, or the fourth indication are presented on the user interface.

17. The system of claim 11, wherein the comparing further comprises:
determining whether the flag setting of the object is the same as the filter setting.

18. A method comprising:
accepting a setting for a filter, the filter setting representing a type of information to be included in a list of object descriptions, the type corresponding to at least one of an end-user version of a software documentation or a technical version of the software documentation;
accepting a setting for a flag of an object, the flag setting representing a category of documentation relevance for the object stored in a repository, the flag setting corresponding to at least one of a first indication that the object is relevant for the end-user version of the software documentation or a second indication that the object is relevant for the technical version of the software documentation, a third indication that the object is conditional upon the acceptance of another object for inclusion in the software documentation, and a fourth indication that the object is always relevant to generation of the software documentation;

comparing the filter setting with the flag setting of the object to determine whether the object is to be included in the software documentation;

extracting a description of the object from the repository, when the comparing indicates a match between the filter setting and the flag setting; and generating the list of object descriptions, the list including the description of the object; and generating the software documentation from the generated list of object description.

\* \* \* \* \*